Feb. 15, 1966    C. N. NOHEN    3,235,761
MOTOR FIELD STRUCTURE FOR A SELF-STARTING
SINGLE PHASE INDUCTION TYPE MOTOR
Filed May 29, 1961    2 Sheets-Sheet 1

INVENTOR
Clarence N. Nohen

Feb. 15, 1966   C. N. NOHEN   3,235,761
MOTOR FIELD STRUCTURE FOR A SELF-STARTING
SINGLE PHASE INDUCTION TYPE MOTOR
Filed May 29, 1961   2 Sheets-Sheet 2

INVENTOR
Clarence N. Nohen

United States Patent Office 3,235,761
Patented Feb. 15, 1966

3,235,761
MOTOR FIELD STRUCTURE FOR A SELF-STARTING SINGLE PHASE INDUCTION TYPE MOTOR
Clarence N. Nohen, Foster, Va.; Mary B. Nohen, executrix of said Clarence N. Nohen, deceased, assignor of one-half to Fred J. Harbaugh
Filed May 29, 1961, Ser. No. 113,429
7 Claims. (Cl. 310—172)

My invention relates to stators for electric motors and more particularly to those used in self-starting, single phase, induction type motors.

In the past, stators or motor field structures of this type have been designed either to produce a high starting torque or one relatively low in relation to the running torque.

Those designed to have a high starting torque required that they be provided with an auxiliary starting apparatus including a winding and a centrifugal switch, and under certain conditions even employed a high capacity fixed condenser in the circuit. Beside being costly, these systems are liable to fail from various well-known causes, the most frequent being the burning out of the auxiliary winding by operational failure of the centrifugal switch.

A good example of a motor having a low starting torque is the popular shaded-pole motor so widely used in applications requiring small fractional horsepower motors. Since this type stator requires no centrifugal switch it is freed of the danger of fire and external explosion so often present in the operation of motors having a centrifugal switch in connection with their windings.

While various attempts have been made to design self-starting, single phase induction type motors without the use of auxiliary starting devices, most attempts have failed to gain popular favor because the stators have not been designed to produce adequate starting torque without sacrificing a certain amount of running characteristics.

The primary object of my invention is to provide a motor field structure for a self-starting single phase electric motor that will have a starting torque and running characteristics comparing very favorably with those of the same rated output requiring auxiliary starting apparatus.

Another object of my invention is to provide a motor field structure as is described in the preceding paragraph possessing but a single winding for running and starting so as to reduce to a very minimum the possibility of the winding being burned out whenever the motor is stalled or overloaded for any length of time that would burn out motors with auxiliary starting windings.

A further object is to provide a stator or motor field structure for a self-starting, single phase induction type motor of any horsepower, large or small, having but a single operative winding that will allow a wide variation in speed in direct proportion to the applied voltage without sacrificing its effective performance.

A still further object of my invention is to provide a stator or motor field structure for a reversible self-starting, single phase induction type motor having a relatively high starting torque and only two windings, each winding being used both for starting and running, and so arranged as to allow the motor to be reversed while the armature is still turning in one direction, without the use of any internal switching device.

Other objects and advantages of my invention will become apparent and my invention better understood from the following description, reference being made, from time to time, to the accompanying drawings in which.

Figure 1:
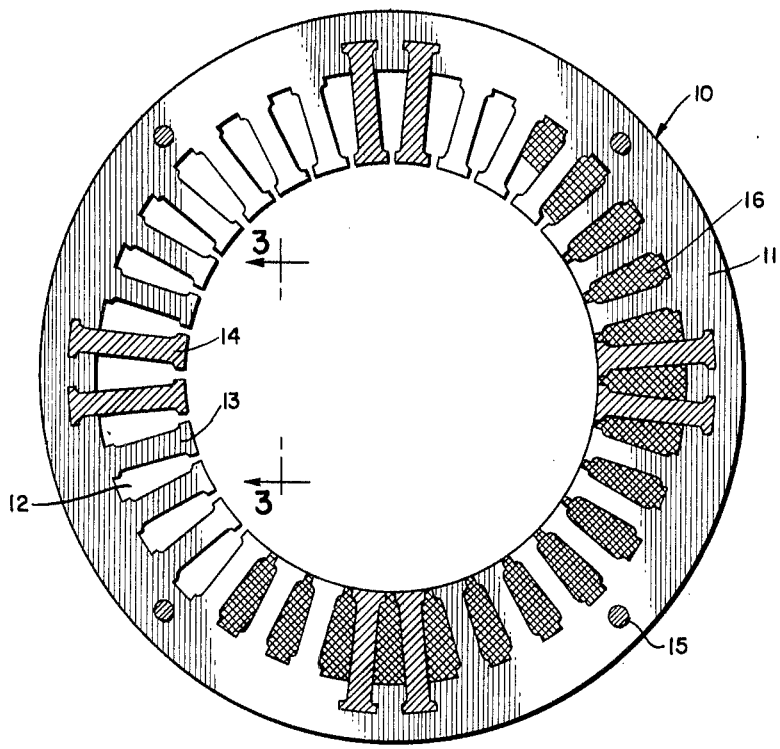
FIGURE 1 is an end elevational view in transverse section of a laminated motor field structure embodying my invention, with part of the windings omitted for the sake of clarity.

The theory of operation of my invention is a new departure from the already established practice in electric motor design, and it is based primarily upon the already accepted scientific fact that almost all materials exhibit signs of some form of inductive influence provided the magnetic power applied is sufficiently great.

In 1845, Michael Faraday, the famous English scientist, concluded that all metals and other materials could be divided into three classes. Those metals like iron, nickel and cobalt which assume an axial direction when placed in a magnetic field were thereafter designated as ferromagnetic and those non-ferrous metals like aluminum, manganese, platinum, tungsten and tin which reacted the same way, except very much weaker, were classified as paramagnetic. Those other non-ferrous metals and materials which arrange themselves at a right angle to the magnetic meridian when placed in a magnetic field were thereafter designated as diamagnetic. Thus bismuth, antimony, lead, copper, silver and gold became classified as diamagnetic metals since they tend to set themselves across the lines of force of any magnetic field in which they are positioned.

The novelty of my invention lines in the proper placement of certain non-ferrous metals and/or other materials having either paramagnetic or diamagnetic characteristics either alone or in combination in the motor field structure of an electric motor in such a way as to sufficiently distort the path of the magnetic flux in certain parts of the field so as to cause a definite and desirable lag which in turn alters the phase enough to greatly increase the starting torque of the motor, itself, and in a way that when the motor has reached its full operating speed, such a phase change does not disagreeably offset its running characteristics.

As is the general practice in the construction of a stator or motor field structure for an electric motor, a series of laminations of magnetically permeable materials are assembled face to face and insulated one from the other by the oxide coating formed on the surfaces of the metal of which they are formed. As is shown in FIGURE 1, each of the core laminations 11 is provided with a plurality of inwardly extending tooth sections 13 which are evenly spaced one from the other to provide winding receiving slots 12 between them, and the teeth sections of each lamination 11 being so arranged in cooperation with each tooth section of each succeeding lamination as to form axially extending rows of tooth sections reaching across the stator 10.

In FIGURE 1 it will be seen that there are eight non-ferrous metal teeth 14 placed in pairs at angles of 90 degrees from each other. The motor field structure is designed to have four poles, the winding of two poles having been omitted for the sake of clarity. I have purposely illustrated the four pole arrangement so as to make it as nearly like FIGURE 5 as possible, for the sake of comparison. In FIGURE 1, it will be seen that the non-ferrous teeth 14 (which are really plates) are in a plane almost parallel to the adjoining teeth 13, while in FIGURE 5, a non-ferrous plate 24 similar in size to the non-ferrous tooth 14 is placed in a position that lies in a plane almost perpendicular to the adjoining teeth 13, and across two of the iron teeth 13 which have been shortened to allow the plate 24 to rest upon them.

In FIGURE 1, the teeth 14 are of lead or alloys of some metals but preferably aluminum and are securely held in place in the developed magnetic field. As a consequence the flux is deflected or distorted enough to cause a sufficient change of phase to secure the desired starting torque without the use of an additional winding for starting the motor.

I have found through experimenting with various metals that they have a widely varied effectiveness and while lead and aluminum give very satisfactory results, copper is of little or no value.

A single non-ferrous tooth 14 in only one of the four poles of FIGURE 1 is sufficient to start the rotor off of "dead-center," but more teeth 14, used in each pole, will increase the effective starting torque. However, I have experimented with various designs involving the use of a different number of teeth 14 in motors having a different number of poles and found that it is the best practice to use as few non-ferrous teeth as possible to secure the required starting torque and still maintain the best running characteristics.

Figure 2:
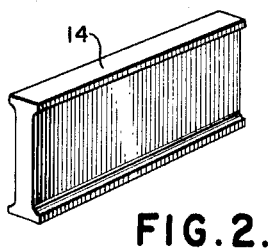
FIGURE 2 is a perspective view of a non-ferrous tooth.

FIGURE 2 is a perspective view of a single tooth 14 made of non-ferrous material—metal being preferred since it helps carry off excessive heat and has more favorable characteristics—or an alloy of certain desirable metals having the proper characteristics.

Figure 4:
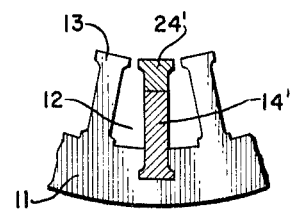
FIGURE 4 is an end elevation fragmentary view of a modification of my invention.
Figure 7:
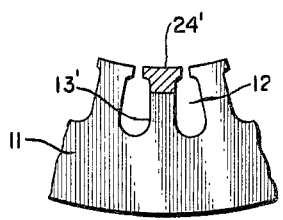
FIGURE 7 is a sectional fragmentary view in elevation of another modification of my invention.

If it is desired, the tooth can be of a sectional construction as shown in FIGURE 4 and FIGURE 7. Thus in FIGURE 4, although it is of aluminum construction, the non-ferrous tooth 14' has a cap of metal 24' having diamagnetic characteristics, or other material acting like a narrow plate covering its top, and in this way positioning the metal or material with the most desirable characteristics as near the apex as possible. In FIGURE 7 a non-ferrous cap, or transverse section 24', is placed on top of a shortened iron tooth 13' to obtain best results.

Figure 3:
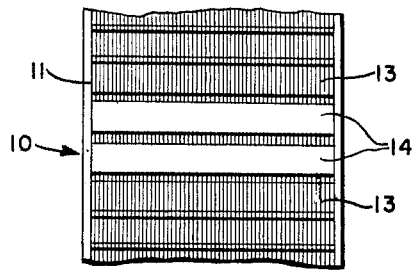
FIGURE 3 is a fragmentary interior elevation of the same motor field structure showing the position of the non-ferrous teeth.

The overall axial length of the non-ferrous tooth or teeth 14 need not be the full width of the motor field structure, as is seen in FIGURE 3, and if not, then the rest of the laminations 11 making up the teeth 13 will help to hold each tooth 14 in place and serve as a post around which the turns of the starting and running winding will be placed.

If the non-ferrous tooth 14 is insufficient then two teeth 14 or more must be used instead of one tooth 14 to gain the proper starting torque, and I prefer each tooth 14 to extend to a point just short of the first and last lamination so that it will be held in its proper place when the motor field structure is assembled and the laminations are held together by the long rivets 15.

Figure 5:
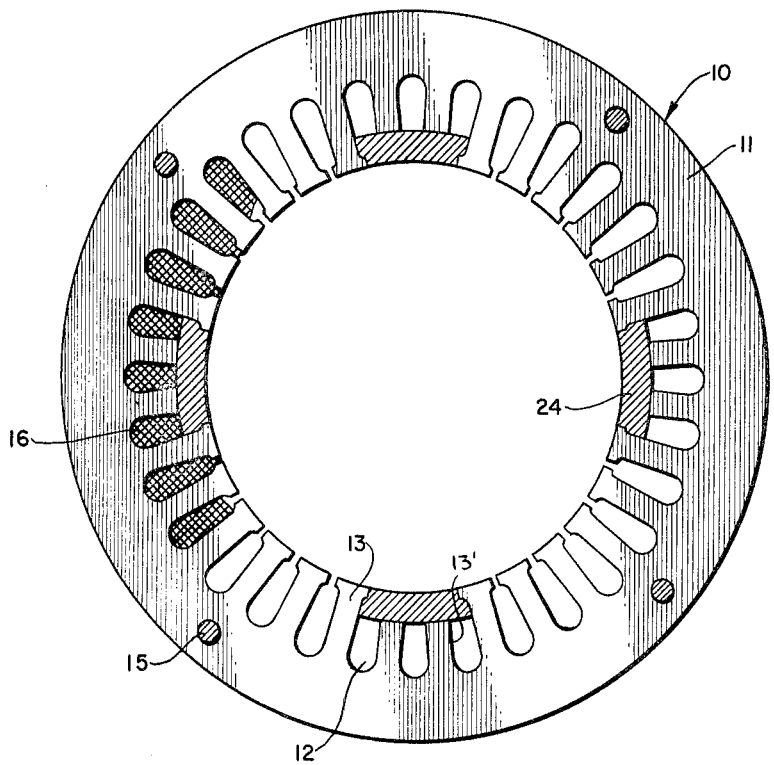
FIGURE 5 is an end elevational view in transverse section of another modification of my invention, with part of the winding omitted for the sake of clarity.
Figure 6:
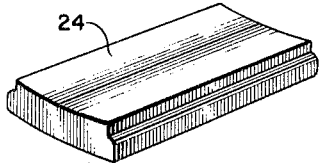
FIGURE 6 is a perspective view of the non-ferrous plate shown in FIG. 5.

FIGURE 5 is an end elevational view of a different modification of my invention wherein I use a plate or transverse section 24 of non-ferrous material, preferably metal such as lead or other material having high resistivity relative to copper that should be avoided. The plate 24 is placed in a position at almost right angles to the adjoining teeth. Two iron teeth 13 are shortened or have their ends spaced farther from the rotor, and allow the plate 24 to be inserted and locked into place just as are the wooden or plastic wedges inserted between the various teeth in the common practice of conventional rotor construction after the winding 16 has been put in the slots 12.

I prefer this method of construction of the motor field structure because the diamagnetic metal or material is closer to the apex of the tooth or teeth and a part 13' of the iron tooth or teeth 13 that has been altered by shortening remains to act as a conductor of the magnetic lines of force formed by the windings 16 in the adjoining slots 12.

It will be found that the direction of rotation of the rotor is always away from the non-ferrous teeth 14 or plates 24 toward the effective center or intermediate tooth 13 being embraced by the initial or innermost turns. For this reason those skilled in the art will find it necessary for counterclockwise rotation to start the winding on, or with the innermost turns around, the first iron tooth 13 to the right of the non-ferrous tooth 14 or plate 24 section and continuing in a conventional manner, reversing the turns when necessary to allow a change in the polarity of the poles in their proper sequence. In a shaded pole motor rotation is just the opposite, from the center of the pole toward the shaded tooth or pole section.

While any conventional and properly distributed single phase winding can be used I prefer winding the tooth 13, termed effective center tooth, to the right of the non-ferrous tooth or teeth 14 (FIG. 1) or plate 24 (FIG. 5) with approximately as many innermost turns of the wire as are around any other two teeth in each field pole as this gives a greater starting impetus. A corresponding number of wires of said turns is disposed in the adjoining slot to the right of said effective center tooth.

Having but one winding for starting and running, termed a start-run winding this motor field structure allows the motor in which it is used to be varied in speed when the proper fixed or variable resistance is used in series with its winding, and thus affords a wide variety of uses which would not be possible if the motor field structure required an auxiliary starting winding and centrifugal switch.

An additional identical winding placed in the motor field structure and embracing the teeth of the core, starting with innermost turns around the first iron tooth 13 to the left of any non-ferrous tooth 14 (FIG. 1) or plate 24 (FIG. 5), or combination of the two, and continuing in a conventional manner, reversing the turns when necessary to allow for a change in the polarity of the poles in their proper sequence, will make the motor in which the field structure is used, reversible when connected to a simple external switching device.

While I have described and illustrated certain embodiments of my invention, other modifications will obviously appear to those skilled in the art. Therefore, I desire it to be understood that I do not wish to be limited to the particular arrangements disclosed but intend in the appended claims to cover any and all variations which do not depart from the true spirit and scope of my invention.

What I claim as new and desire to secure by Letters Patent of the United States is:

1. A field structure for a single phase self-starting induction motor having a rotor, said structure having a core of magnetically permeable material, a single continuous start-run winding forming with said core one of a plurality of poles when connected to a source of alternating current, said one pole having a plurality of teeth including an intermediate tooth embraced by said winding with its innermost turns surrounding said tooth and projecting toward said rotor to form an air gap, at least one other of said teeth being constructed with a small transverse section of other than ferrous material having high resistivity relative to copper and located without said innermost turns on one side of said tooth for providing starting torque in a direction away from said one other of said teeth.

2. The invention as set forth in claim 1 wherein said one other of said teeth is shorter than the others and is provided at its apex with said section of other than ferrous material.

3. A field structure for a single phase self-starting induction motor having a rotor and a core of magnetically permeable material, a single continuous start-run winding forming with said stator core one of a plurality of poles when connected to a source of alternating current, said one pole having a plurality of spaced similar teeth projecting toward said rotor to form winding slots and an airgap between the ends of said teeth and said rotor, said teeth including an intermediate tooth being embraced by said winding having its initial or innermost turns of wire surrounding said tooth with wires of said turns in a slot adjacent said tooth, said turns being substantially greater in number than those around any other two spaced teeth and in corresponding adjoining slots thereof, means providing starting torque comprising two or more adjoining teeth having their magnetic ends spaced a substantially greater distance from said rotor than are the ends of the other teeth and situated on the side of said intermediate tooth opposite to the desired direction of rotor rotation.

4. A motor field for a single phase self-starting induction motor having a rotor and comprising a core of magnetically permeable material with spaced similar teeth forming winding slots and having their ends projecting uniformly toward said rotor to form an air gap therewith, a single continuous start-run winding embracing said teeth and forming one of a plurality of poles, said one pole having an intermediate tooth surrounded by initial or innermost turns of wire of said one pole winding, means in combination with said tooth providing starting torque comprising at least one other of said teeth having its magnetic end spaced substantially at greater distance from said rotor than are the ends of the other teeth in said pole and located without said innermost turns on the side of said tooth opposite to the desired direction of desired rotor rotation.

5. The invention as set forth in claim 4 wherein a second of said teeth next adjacent said intermediate tooth and said one other of said teeth has its end likewise spaced substantially a greater distance from said rotor.

6. The invention as set forth in claim 4, wherein the number of said turns surrounding said tooth and the corresponding wires thereof in the slot adjoining said tooth on the side opposite to said one other of said teeth is of the order of twice as great as the turns of wire around any pair of spaced teeth and in corresponding adjoining slots thereof in said pole.

7. A single phase self-starting induction motor having a rotor and a field core of magnetically permeable material with spaced similar teeth forming winding slots, said teeth having their ends projecting uniformly toward said rotor forming an annular airgap therewith, a single continuous start-run field winding in said slots embracing said teeth and forming a first plurality of poles, one of said poles having an intermediate tooth surrounded by innermost initial turns of said winding, means in combination with said tooth providing starting torque comprising at least one other of said teeth having its magnetic end spaced a greater distance from said rotor than are the ends of the other teeth in said pole and located without said innermost turns on one side of said tooth opposite the desired direction of rotation, and a second single start-run winding like said first named winding embracing said teeth forming a second plurality of poles for rendering said motor reversible when connected to a source of alternating current in place of said first named winding, one of said second plurality of poles including said one other of said teeth having an intermediate tooth surrounded by innermost turns of said second winding and located on the opposite side of said other of said teeth from said first named tooth.

References Cited by the Examiner
UNITED STATES PATENTS

| | | | |
|---|---|---|---|
| 515,216 | 2/1894 | Gutmann | 310—168 |
| 606,863 | 7/1898 | Gutmann | 310—168 |
| 1,980,698 | 11/1934 | Reardor | 310—261 |
| 2,121,550 | 6/1938 | Nyman | 310—172 |
| 2,185,990 | 1/1940 | Schurch | 310—172 |
| 2,272,435 | 2/1942 | Schurch | 310—172 |
| 2,315,917 | 4/1943 | Arutunoff. | |
| 2,913,607 | 11/1959 | Douglas | 310—261 |

FOREIGN PATENTS

| | | |
|---|---|---|
| 176,249 | 9/1953 | Austria. |
| 13,006 | 6/1914 | Great Britain. |
| 160,391 | 5/1905 | Germany. |

ORIS L. RADER, *Primary Examiner.*

MILTON O. HIRSHFIELD, *Examiner.*